United States Patent [19]
Huydts et al.

[11] 3,937,072
[45] Feb. 10, 1976

[54] SYSTEM FOR MEASURING PLASTIC DEFORMATION CREATED BY A BENDING PRESS

[75] Inventors: Eduard J. C. Huydts, Dusseldorf; Alfons Klassen, Krefeld; Erich Nacke, Sevelen, all of Germany

[73] Assignee: G. Siempelkamp & Co., Krefeld, Germany

[22] Filed: June 5, 1974

[21] Appl. No.: 476,402

[30] Foreign Application Priority Data
June 6, 1973 Germany............................ 2328695

[52] U.S. Cl. .................................................. 73/100
[51] Int. Cl.² ............................................... G01N 2/20
[58] Field of Search ................... 73/100, 144, 88 R

[56] References Cited
UNITED STATES PATENTS
2,343,229  2/1944  Stone et al............................ 73/144

*Primary Examiner*—Jerry W. Myracle
*Attorney, Agent, or Firm*—Karl F. Ross; Herbert Dubno

[57] ABSTRACT

A sheet-metal workpiece is clamped in a bending press with its one side lying on a pair of bending beams spaced apart in a transport direction and with a bending roller pressing in a bending direction transverse to the transport direction against the other side of the workpiece between the beams. A first feeler roller is pressed against the one side of the workpiece at the first location opposite the bending roller with a force sufficient to relieve substantially all of the elastic deformation in the workpiece. The workpiece is contacted to each side of the first feeler roller with second and third feeler rollers spaced apart in the transport direction and the spacing between the first feeler roller and the second and third feeler rollers in the bending direction is then measured to ascertain the permanent bend (plastic deformation) of the workpiece.

6 Claims, 3 Drawing Figures

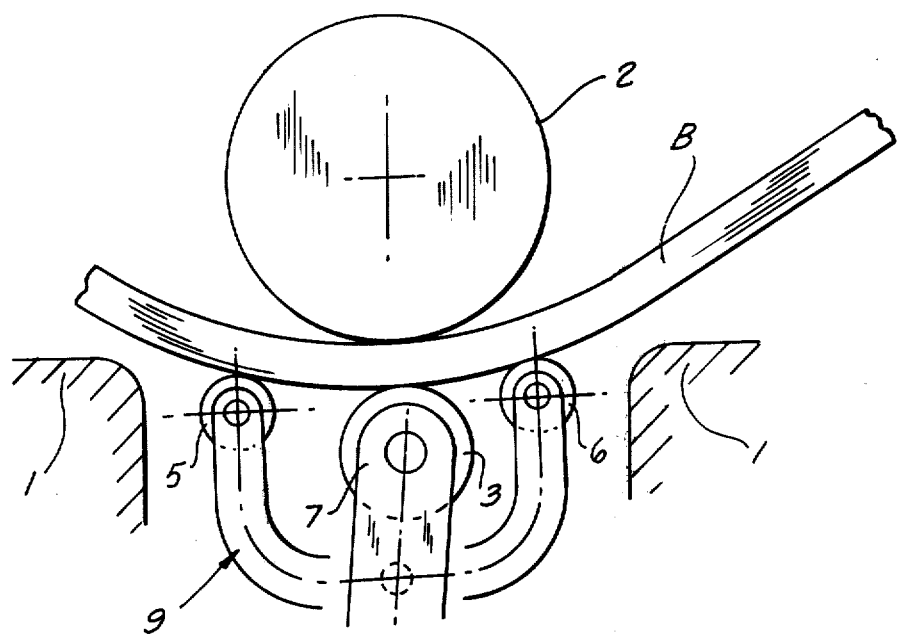
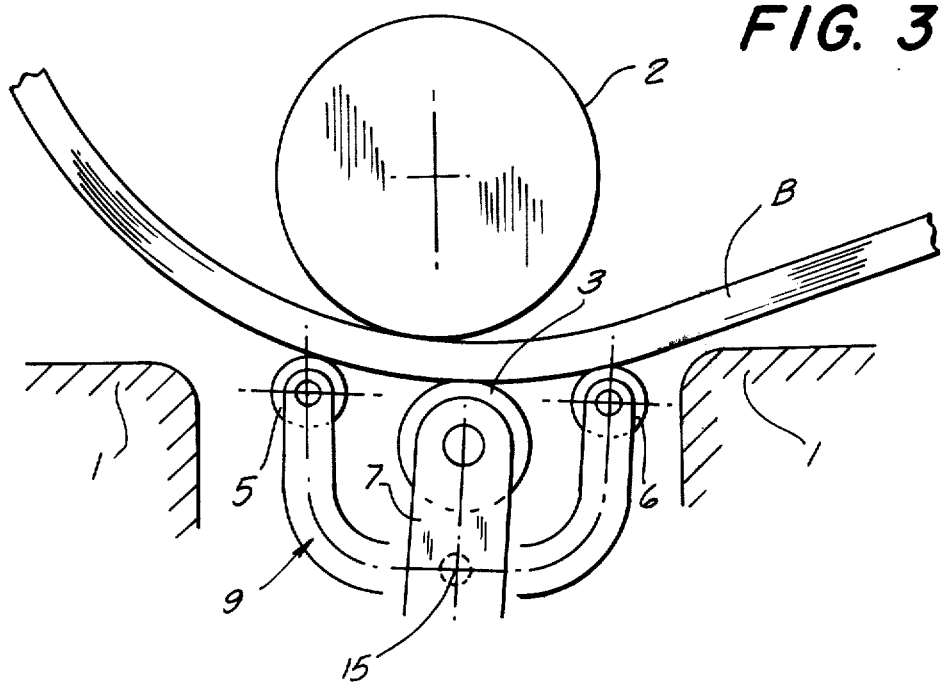

3,937,072

SYSTEM FOR MEASURING PLASTIC DEFORMATION CREATED BY A BENDING PRESS

FIELD OF THE INVENTION

The present invention relates to a method of an apparatus for measuring the permanent deformation of a workpiece in a bending press. More particularly this invention concerns an apparatus which determines the curvature of a permanent bend imparted to a workpiece in a bending press.

BACKGROUND OF THE INVENTION

A bending press has a pair of bending beams and a bending roller engageable between these beams. The workpiece is laid with its one side on the bending beams and the bending roller is pressed in a bending direction against the other side of the workpiece between the beams. The pressure is such as to exceed the elastic limit of the workpiece so that the workpiece is plastically and permanently deformed.

It is necessary during such a bending process to determine the extent of this permanent deformation. Normally this is done simply by measuring the position of the bending roller relative to the position of the bending beam. Such a system has the considerable disadvantage that no compensation is made for the residual elastic deformation of the workpiece. This elastic deformation must be allowed for by multiplying the measurement obtained with a factor depending on workpiece material, workpiece dimensions, workpiece temperature, and other similar factors. Even with such compensation it is very difficult to obtain an exact measurement of the radius of curvature of the bend imparted to the workpiece. A more accurate arrangement requires the removal of the workpiece from the bending press so that the residual elastic deformation imparted thereto can be relieved and the permanent or plastic deformation directly measured, usually using a template.

In a bending operation wherein, for instance, steel plates are bent into cylindrically arcuate shapes it is necessary to monitor the radius of curvature imparted to the workpieces with each step of the bending operation. This is necessary because the bending characteristics change from workpiece to workpiece and it is essential that the finished cylindrically arcuate sections all be of identical overall diameter so as to fit together to form a storage tank or the like. In such an arrangement the necessity of frequently removing the workpiece from the bending press and measuring the radius of curvature of the workpiece is disadvantageous, as it slows production considerably.

OBJECTS OF THE INVENTION

It is therefore an object of the present invention to provide an improved method of and apparatus for measuring the permanent deformation of a workpiece as produced by a bending press.

Another object of this invention is to provide such a system which measures this permanent plastic deformation without removal of the workpiece from the press.

A further object is to provide an apparatus which allows the press operator to monitor continuously the bending operation.

SUMMARY OF THE INVENTION

These objects are attained according to the present invention in a method wherein the workpiece is clamped in a bending press with its one side lying on a pair of bending beams spaced apart in a transport direction and with a bending roller pressing in a bending direction transverse to the transport direction against the other side of the workpiece between the beams. In accordance with the present invention a first feeler is pressed against the one side of the workpiece at a first location opposite the bending roller with a force sufficient to relieve substantially all of the elastic deformation in the workpiece. The workpiece is then contacted on the one side engaged by the first feeler with second and third feelers at second and third locations spaced from the first location in the transport direction and the spacing between the first feeler and the second and third feelers is measured, this spacing being proportional to the permanent bend in the workpiece.

The method according to the present invention has the considerable advantage that the operator need merely actuate the measuring system in order to relieve any residual elastic stress in the workpiece and determine whether the workpiece has been bent sufficiently. If it has not, he need merely press the bending roller against the workpiece again to bend it further. The workpiece need not be removed from the bending press.

In accordance with a further feature of this invention the locations at which the second and third feelers engage the workpiece flank the location at which the first feeler engages the workpiece. These feelers in accordance with this invention are all constituted as rollers rotatable above axes parallel to each other and all perpendicular both to the bending direction and the transport direction, so that the workpiece may be rolled on the feeler rollers.

According to yet another feature of this invention the second third feeler rollers flanking the first feeler roller are carried on the ends of the arms of a yoke which is pivotal about an axis parallel to the roller axis so that the three rollers may be brought into engagement with a workpiece that is tipped or not perfectly aligned with the three feeler rollers.

In accordance with still another feature of this invention the central feeler roller may be driven so that after the bending operation the press operator actuates the measurer to determine if the bend is correct, if it is he then operates the drive for the central feeler roller which advances the workpiece a predetermined distance in the transport direction through the press. Then the bending roller is brought down on the workpiece to form another bend therein.

BRIEF DESCRIPTION OF THE DRAWING

The above and other objects, features and advantages will become more readily apparent from the following description, reference being made to the accompanying drawing in which:

FIGS. 2 and 3 are views similar to FIG. 1 illustrating the measuring apparatus in various operative positions.

SPECIFIC DESCRIPTION

Figure 1:
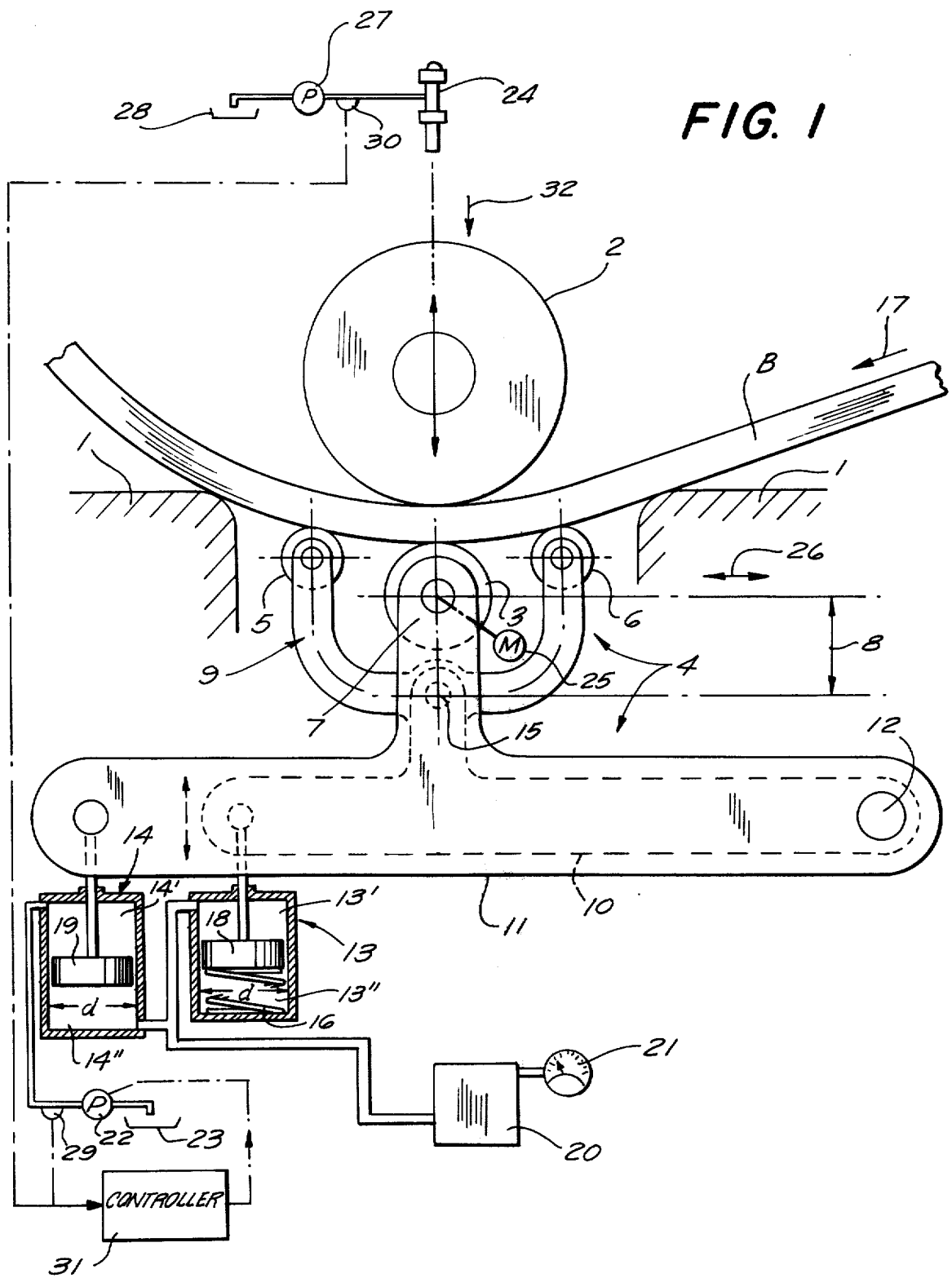
FIG. 1 is a largely diagrammatic side view illustrating the system according to the present invention.

As shown in FIG. 1 a workpiece B is displaced in a transport direction 17 between a pair of like bending beams 1 one of which is displaceable toward and away from the other as shown by arrow 26 of FIG. 1, and under a bending roller 2 displaceable by a hydraulic cylinder 24 in a direction 32 toward the workpiece B. When the roller 2 is pressed against the upper side of the workpiece B whose lower side rests on the two beams 1, a bend is formed in the workpiece as shown.

Located below the workpiece B is a bend-measuring arrangement 4 comprising a first central feeler roller 3 flanked by a pair of smaller feeler rollers 5 and 6. The central roller 3 is carried on a pair of arms 7 and is rotatable by a motor 25 as will be described below. The feeler rollers 5 are rotatable about respective axes parallel to the axis of rotation of the roller 3 and perpendicular to the pressing direction 32 and transverse to the transport direction 17. These rollers 5 and 6 are carried between a pair of like in-line yokes 9 pivoted at 15 on a pair of T-shaped levers 10 lying between a pair of levers 11 formed with the arms 7. The levers 10 and 11 are all pivoted about a common axis 12 parallel to the pivot axes of the rollers 3, 5, and 6.

The lever 11 is pivotal by a hydraulic cylinder 14 having a piston 19 connected to the outer end of this lever 11 so as to operate it as a third-class lever. The piston 19 defines a pair of chambers 14', and 14" within the cylinder 14, the chamber 14' being connected to a pump 22 associated with a reservoir 23 so that this pump may withdraw fluid from the chamber 14' and raise the lever 11, thereby pressing the roller 3 against the under surface of the workpiece B.

In addition another piston 18 of another cylinder arrangement 13 is connected to the outer end of the third-class lever 10 carrying the rollers 5 and 6. The chamber 13" below the piston 18 is provided with a coil spring 16 which urges the piston 18 up and therfore urges the rollers 5 and 6 up. The chamber 13' above the piston 18 and the chamber 14" below the piston 19 are both connected to a pressure vessel 20. A barometric-type pressure meter 21 is connected to the upper region of the vessel 20 and therefore indicates the pressure of the air chamber above the fluid in the vessel 20.

Since both of the pistons 18 and 19 are of like diameter $d$ the pressure indicated by the meter 21 will be proportional to the distance 8 between the pivot axis of the roller 3 and the pivot axis 15 of the yoke 9 carrying the rollers 5 and 6.

A pump 27 associated with the reservoir 28 operates the cylinder 24 which actuates the bending roller 2. Pressure sensors 29 and 30 are respectively connected to the cylinders 14 and 24 and are both connected to a controller 31 which operates the pump 22 so that the pressure exerted by the roller 3 in a direction opposite to that exerted by the roller 2 can be balanced.

The device operates as follows:

Once a workpiece is bent as shown in FIG. 1, the pump 22 is actuated until the roller 3 presses with enough force against the bottom side of the workpiece B to relieve substantially all of the elastic deformation therein.

FIGS. 2 and 3 show how this feeler 3 can be pressed with sufficient force against the underside of the workpiece to lift it free of the two bending beams 1. The feelers 5 and 6 will engage against the workpiece to either side of the feeler 3 and the position of the meter 21 will indicate the curvature of the workpiece between the two beams 1. Pivoting of the yoke 9 about the axis 15, which is parallel to the pivot axis of the feeler 3 and the bending roller 2', allows this yoke 9 to tip as shown in FIG. 2 in order to compensate for unevenly bent workpieces.

The motor 25 is operable in the positions of FIGs. 2 and 3 so as to advance the workpiece in a transport direction 17 once the proper bend is imparted to this workpiece.

We claim:

1. A method of measuring the permanent bend in a workpiece clamped in a bending press with its one side lying on a pair of beams spaced apart in a transport direction and with a bending roller pressing in a bending direction transverse to said transport direction against the other side of the workpiece and between said beams, said method comprising the steps of:

pressing a first feeler against said one side of said workpiece at a first location opposite said bending roller with a force sufficient to move said workpiece and relieve substantially all of the elastic deformation in said workpiece;

contacting said workpiece on said one side with second and third feelers at respective second and third locations spaced from said first location in said transport direction; and measuring the distance between said first feeler and said second and third feelers in said bending direction, said distance being proportional to the permanent bend in said workpiece.

2. The method defined in claim 1 wherein said second and third locations flank said first location.

3. An apparatus for measuring the permanent bend in a workpiece comprising a bending press for clamping a workpiece with its one side lying on a pair of beams spaced apart in a transport direction; a bending roller pressing in a bending direction transverse to said transport direction against the other side of the workpiece and between said beams;

a first feeler engageable with said one side of said workpiece at a first location opposite said bending roller;

means for pressing said first feeler against said one side at said first location with a force sufficient to relieve substantially all of the elastic deformation in said workpiece;

second and third feelers engageable with said one side of said workpiece between said beams at a respective second and third locations spaced from said first location in said transport direction;

means for urging said second and third feelers against said one side at said second and third locations;

indicating means for measuring the distance between said first feeler and said second and third feelers in said pressing direction, whereby said distance is proportional to the permanent bend in said workpiece, said second and third locations flanking said first location, said feelers being rollers rotatable about generally parallel axes tranverse to said bending and transport direction;

at least one rigid yoke, said second and third feelers being carried on said yoke; and means constituting for said yoke a pivot axis, said pivot axis of said first feeler being parallel to said pivot axis of said yoke and between said pivot axis of said yoke and said bending roller.

4. The apparatus defined in claim 3, further comprising a first lever pivotal about a lever axis parallel to said pivot axes and carrying said first feeler, and a second lever pivotal about said lever axis and carrying said yoke.

5. The apparatus defined in claim 4, further comprising a pair of hydraulic cylinders each engageable with a respective one of said levers, the cylinder engaging said first lever constituting said means for pressing said first feeler and the cylinder engaging said second lever constituting said means for urging.

6. The apparatus defined in claim 5 wherein said feelers are carried on said levers between said cylinders and said lever axis.

* * * * *